UNITED STATES PATENT OFFICE.

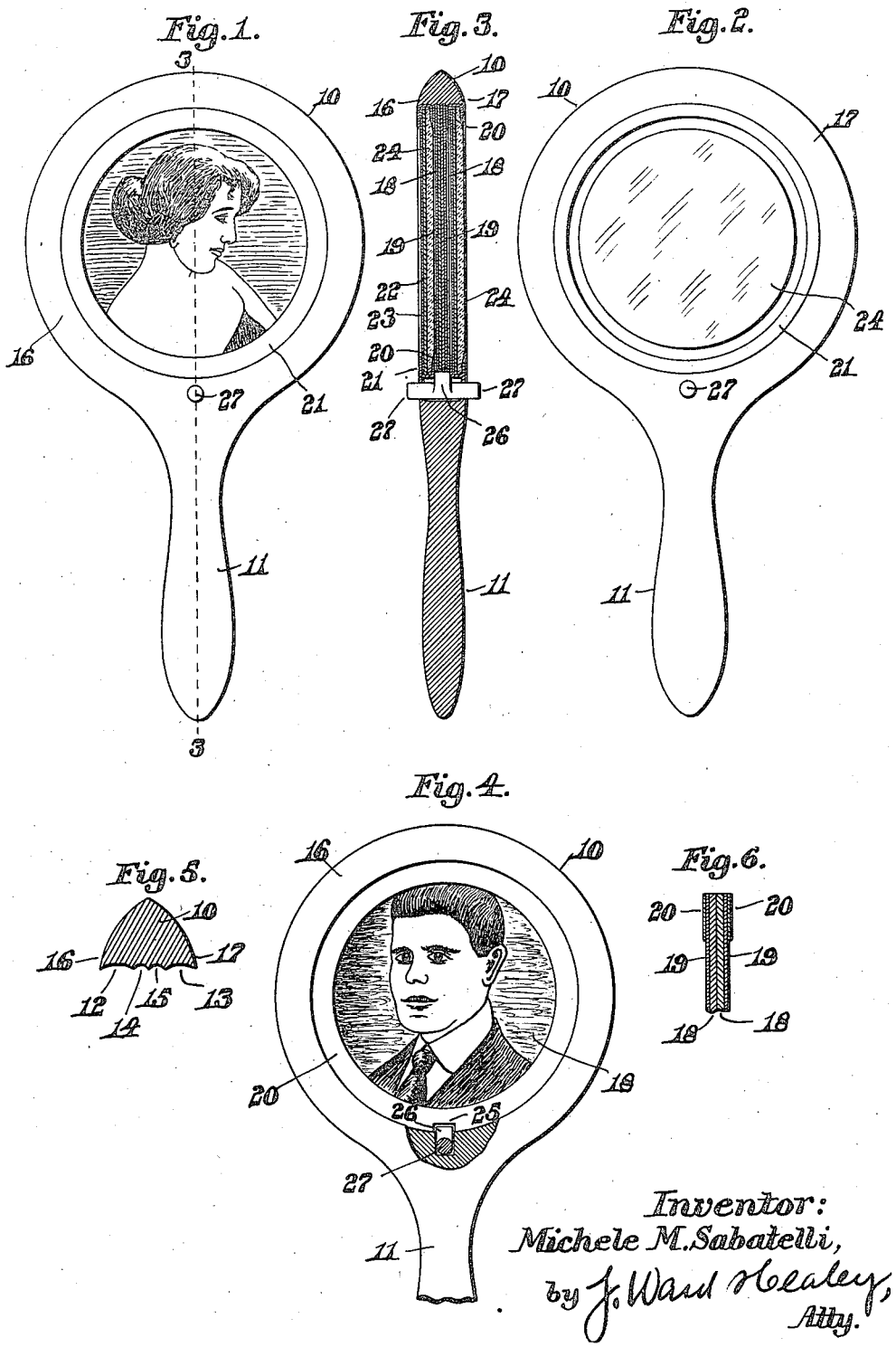

MICHELE M. SABATELLI, OF LEOMINSTER, MASSACHUSETTS.

HAND-MIRROR.

1,262,101. Specification of Letters Patent. Patented Apr. 9, 1918.

Application filed June 28, 1917. Serial No. 177,568.

*To all whom it may concern:*

Be it known that I, MICHELE M. SABATELLI, a subject of the King of Italy, and a resident of Leominster, in the county of Worcester and Commonwealth of Massachusetts, have invented certain new and useful Improvements in Hand-Mirrors, of which the following is a specification.

This invention relates to hand mirrors, and particularly to devices of this character adapted to confine one or more photographs normally hidden from view but adapted to be exposed when desired.

The invention has for its object the production of a hand mirror particularly designed for the use of ladies in which the photographs of friends may be positioned in such manner that ordinarily they cannot be seen, but which may be uncovered whenever the owner desires to look at them.

The invention further consists in certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described.

Of the drawings:

Figure 1 represents an elevation of one side of a hand mirror embodying the principles of the present invention.

Fig. 2 represents an elevation of the opposite side thereof.

Fig. 3 represents a longitudinal section of the same.

Fig. 4 represents a partial elevation with the mirror removed, and Figs. 5 and 6 represent sectional details to be hereinafter referred to.

Similar characters designate like parts throughout the several figures of the drawings.

In the drawings, 10 is the frame of a mirror provided with the radial handle 11 by which the mirror may be supported in the hand of the user.

The frame 10 is preferably annular, and its inner annular face is provided with two outer depressions 12—13 and two inner grooves 14—15 centrally disposed relatively to the outer faces 16—17. Each groove 14 or 15 is adapted to receive a disk 18 preferably having a photograph or some other pictorial representation thereon, said photographs preferably facing outwardly.

The exposed faces of the disks 18 are protected by disks 19 of mica or some similar transparent material reinforced by the annular member 20 permanently secured thereto so that the edges of said mica disks are prevented from becoming injured when the disks 19 are snapped into place.

The annular members 20 have sufficient resiliency to permit them to be snapped into the grooves 14—15 and when thus positioned to retain the disks 18—19 perfectly flat as indicated in Fig. 3 of the drawing.

In each of the depressions 12—13 is adapted to be positioned a cylindrical member 21 U-shaped in cross section and containing a disk 22 having a photograph or some similar pictorial representation on one face thereof protected by a disk 23 of transparent material and a circular mirror 24, the back of which contacts with the back of the photograph disk 22.

The cylindrical member 21 may be positioned in the depression 12 or 13 of the frame 10 with the photograph side of the disk 22 exposed as shown in Fig. 1 or with the mirror 24 exposed as shown in Fig. 2.

When the members 21 are positioned in the depressions 12—13, the photographs on the disks 18 are hidden from view and may be kept in secret where the user of the mirror may readily gain access thereto when desired.

Preferably the photograph of some particular friend may be exposed on one face of the device as shown in Figs. 1 and 4. The annular members 20, the mica disks 19, and photograph disks 18 are all provided with peripheral notches 25 into which extend the projection 26 on the slidable member 27 the ends of which extend beyond the outer faces of the frame 10.

This projection 26 registers the disks 18—19 and members 20 and prevents their rotation in the grooves 14—15. The opposite ends of the projection 26 bear against the inner faces of the cylindrical members 21. By pressing on either end of the slidable member 27 mounted in the frame 10, one of the cylindrical members 21 may be forced from a depression 12 or 13 so that access may be gained to the interior photographic disks 18.

This makes a most convient form of hand mirror particularly adapted for the use of persons desiring to have near them at all times the photographs of their closest friends which photographs they do not desire to have exposed to others.

It is believed that the many advantages of a device of this character will be fully understood from the foregoing description.

Having thus described my invention, I claim:

1. In a device of the class described, an annular member provided with a plurality of centrally disposed depressions on its inner face; photographs positioned in said depressions; and disks adapted to be positioned within said annular member on opposite sides of said photographs, one of said disks having a mirror on one side and a photograph on the other side.

2. In a device of the class described, an annular member provided with a plurality of centrally disposed depressions on its inner face; photographs positioned in said depressions; disks adapted to be positioned within said annular member on opposite sides of said photographs; and a slidable member for displacing said disks from said annular member.

3. In a device of the class described, an annular member provided with a plurality of centrally disposed depressions on its inner face; photographs positioned in said depressions and having alined notches in the edges thereof; disks adapted to be positioned within said annular member on opposite sides of said photographs; and a slidable member having a shouldered portion positioned within said notches and adapted to be moved in opposite directions to displace said disks from said annular member.

Signed by me at Leominster, Massachusetts, this 27th day of June, 1917.

MICHELE M. SABATELLI.

Wittnesses:
BLANCHE U. McMANUS,
CHARLES A. JOSLIN.